United States Patent [19]

McCall

[11] Patent Number: 4,624,242
[45] Date of Patent: Nov. 25, 1986

[54] SOLAR HEAT TRANSFER AND STORAGE SYSTEM

[75] Inventor: Danny McCall, Hickory, N.C.

[73] Assignee: Examplar, Hickory, N.C.

[21] Appl. No.: 765,141

[22] Filed: Aug. 13, 1985

[51] Int. Cl.$^4$ ............................................. F24J 2/42
[52] U.S. Cl. ................................... 126/427; 126/436; 126/435; 126/446; 165/171; 165/183
[58] Field of Search ................. 137/68.1, 67; 126/430, 126/436, 427, 403, 435, 446; 165/171, 183

[56] References Cited

U.S. PATENT DOCUMENTS

| | | |
|---|---|---|
| 2,823,016 | 2/1958 | Greer ................................... 165/183 |
| 3,996,919 | 12/1976 | Hepp . |
| 4,063,546 | 12/1977 | Schmid et al. ......................... 126/436 |
| 4,112,922 | 9/1978 | Skinner et al. ........................ 165/171 |
| 4,131,158 | 12/1978 | Abhat et al. . |
| 4,191,166 | 3/1980 | Saarem et al. . |
| 4,250,958 | 2/1981 | Wasserman . |
| 4,270,523 | 6/1981 | Van Heel . |
| 4,333,516 | 6/1982 | Krueger et al. ........................ 137/67 |
| 4,334,518 | 6/1982 | Ort ...................................... 126/437 |
| 4,339,930 | 7/1983 | Kirts . |
| 4,362,207 | 12/1982 | Farfaletti-Casali et al. . |
| 4,367,788 | 1/1983 | Cordon . |
| 4,371,029 | 2/1983 | Lindner et al. . |
| 4,399,807 | 8/1983 | Buckley et al. . |
| 4,421,101 | 12/1983 | Stice . |
| 4,491,172 | 1/1985 | Hitchin .................................. 126/436 |

Primary Examiner—Carroll B. Dority, Jr.
Attorney, Agent, or Firm—Shefte, Pinckney & Sawyer

[57] ABSTRACT

A heat transfer and storage system including a storage chamber containing a phase change material, a water heater having a first conduit in which the potable water is conveyed, and a solar collector having a second conduit through which a heat transfer liquid is conveyed. Portions of the first and second conduits extend through the storage chamber in adjacent heat conducting relationship with fin means interposed therebetween and extending into the phase change material, and connecting means are provided for holding the conduits and the fins in place. A control system is provided for independently controlling the flow of the heat transfer liquid and the potable water in response to the sensed temperature of the phase change material, the heat transfer liquid and the potable water. The storage chamber is provided with an ullage bag for accommodating the expansion and contraction of the phase change material without exposing it to ambient air. The conduit for the heat transfer liquid includes a segment which will dissolve upon such liquid becoming acidic, and which will then result in an alkaline material being introduced into the acidic heat transfer liquid.

21 Claims, 7 Drawing Figures

SOLAR HEAT TRANSFER AND STORAGE SYSTEM

BACKGROUND OF THE INVENTION

The present invention generally relates to heat transfer and storage systems which may readily be incorporated into conventional heating systems in order to provide a heat collection and distribution system, preferably utilizing a solar collector panel for collecting solar heat energy. Electronic controls to command and regulate the various components of the system may be included. The present invention is particularly directed to a solar heat collection unit which utilizes a phase change material to store collected solar heat within the unit and a system utilizing such a unit as a component part.

As used herein the term "phase change material" means any substance or combination of substances which, when changing state, have the property of remaining at substantially a constant temperature while absorbing or yielding up significant amounts of heat energy. For example, $H_2O$ changes state, from liquid (water) to solid (ice) or from solid (ice) to liquid (water), substantially at 32 degrees Fahrenheit (0 degrees Celsius). $H_2O$ will remain at a constant temperature substantially at 32 degrees Fahrenheit until the change of state is complete. Approximately 144 BTU will be absorbed by a pound of $H_2O$ during its change of state from ice to water and approximately 144 BTU will be yielded up by a pound of $H_2O$ during its change of state from water to ice.

As used herein the term "paraffin waxes" means one or more phase change materials selected from the group of straight-chained hydrocarbon materials unusually obtained by chilling paraffin distillate to remove the heavy oils. These materials may generally be represented by the chemical formula $(C_nH_{(2n+2)})$ where n equals from about 26 to about 30.

As used herein the term "latent heat" means the heat per unit mass or mole required to produce a change of phase of a given material at a constant temperature and pressure. Often an adjective is added to specify the type of phase transistion involved and the adjective "latent" is omitted, e.g. (latent) heat of evaporation, (latent) heat of sublimation, (latent) heat of fusion, etc.

As used herein the term "sensible heat" means the heat absorbed per unit mass or mole of a given material in raising the temperature of the material without effecting a change in the phase of the material.

Systems for collecting, storing and transferring solar energy for utilization in conjunction with residential water heaters are well-known, and it is a known practice to use a phase change material in such systems for the purpose of storing the energy of the sun as disclosed, for example, in Ashote U.S. Pat. No. 4,131,158 and Lindner et al U.S. Pat. No. 4,371,029. It is also known that when a phase change material is utilized, heat conducting fins may be provided within the phase change material to facilitate the transfer of heat to and from such material as disclosed, for example, in the aforesaid Lindner et al patent and in Hepp U.S. Pat. No. 3,996,919. However, when such fins are used, it is conventional practice to dispose the fins in parallel planes extending radially from the conduit which conducts the heated liquid, and into the phase change material. While this fin arrangement serves the desired purpose of increasing the efficiency of the heat transfer to and from the phase change material, it significantly increases the manufacturing cost of the system because the relatively large number of thin, relatively closely spaced fins must be welded or otherwise individually fixed to the conduit at close spacings which require time-consuming and skilled labor. The system of the present invention overcomes the drawback of prior art arrangements by providing a fin arrangement that can be fabricated quickly and at a relatively small cost, and that has a unique interaction with a plurality of conduits for conducting heat transfer liquids therein.

In solar systems of the type generally described above, some attention has been given to a control system for increasing the efficiency of the system by shutting down the circulation of the fluid from the solar collector to the heat storage unit when the temperature in the solar panel liquid circuit in less than the temperature in the storage vessel. Thus, Saarem et al U.S. Pat. No. 4,191,166 discloses a closed system including a solar collector, a storage tank and a pump which is controlled to stop the circulation of the liquid flow from the collector to the storage tank when the temperature of the collector liquid is less than that in the storage tank, and also to stop such circulation if the storage tank temperature exceeds a predetermined limit. A somewhat similar control for a closed circulating system is disclosed in Buckley et al U.S. Pat. No. 4,399,807 where an automatic overtemperature control is provided to protect the collector in the event of the liquid circulation through the collector falls below a predetermined limit. Kirts U.S. Pat. No. 4,339,930 discloses a solar system having a collector, a domestic water heater, a heat exchanger, a heat pump, and a thermal storage unit, and a somewhat complicated control system that operates single pump for the entire system and a plurality of valves so that the fluid flow to and from the collector is routed through the several aforesaid components of the system as a result of the differentials and relationship of the sensed temperature in the water heater, the collector and thermal storage system. In contrast to these known control arrangements, the system of the present invention includes a combined heat exchange and storage unit, and separate fluid circuits for the collector and the water heater which are independently controlled to significantly improve the efficiency of the overall system.

Another problem frequently encountered in solar collector systems utilizing a phase change material such as paraffin is the problem of properly containing the phase change material while still providing an effective means for accommodating the substantial volumetric change of the phase change material when the phase change occurs (e.g., from solid to liquid, and from liquid to solid). One known solution to this problem has been to encase the phase change material within the confines of specially formed flexible tubular containers as disclosed in Farfaletti-Casali et al U.S. Pat. No. 4,362,207 or Wasserman U.S. Pat. No. 4,250,958, or to provide a biased compression member that permits expansion and contraction of the phase change material while maintaining it under compression as disclosed in Van Heel U.S. Pat. No. 4,270,523, or to load the phase change material into individual sealed pouches or bags formed of a resilient plaster material as disclosed in Stice U.S. Pat. No. 4,421,101 and Cordon U.S. Pat. No. 4,367,788. While all of these methods of containing the phase change material appear to protect the phase change material from undesirable and potentially destructive contact with ambient air while accommodating for the above-described volumetric variations in the phase change material, they are also relatively expensive in terms of initial cost and installation. In the system of the present invention, a simple and effective arrangement is provided which allows for significant volumetric variations in the phase change material while still permitting the material to be easily loaded into a rigid container which is free of contamination by ambient air.

Finally, solar collector systems often utilize certain types of heat transfer liquids other than water which are designed to increase the efficiency of the operation of the system, and some of these liquids, such as propyl glycol, will in time become acidic. When this happens, the acidic nature of the liquid will tend to cause deterioration and corrosion of the conduits, fittings, seals and other components exposed to the liquid. Heretofore, this problem has been dealt with by the costly and time consuming procedure of periodically flushing the acidic liquid from the system and replacing it with a fresh supply, and, in some cases, the replacement of the fluid is done only after the fluid has become acidic and damage to the system components has already occurred. The present invention provides a very simple and inexpensive addition which will automatically neutralize the acid in the heat transfer liquid shortly after it become acidic, without the necessity of flushing or replacing such liquid.

SUMMARY OF THE INVENTION

In accordance with the present invention, a heat transfer and storage system is provided which can be readily connected to a source for utilizing the stored heat, such as a conventional residential water heater. This system is highly efficient, easy to install and operate, and very inexpensive to build and install.

Briefly summarized, the system comprises a heat storage chamber having a phase change material therein, a water heater that contains potable water and that includes a first conduit arrangement through which the water flows, with a portion of the first conduit extending through the phase change material in the heat storage chamber, and a collecting unit for collecting heat energy which includes a second conduit arrangement having a portion thereof extending through the phase change material in the heat storage chamber in adjacent parallel relation to the aforesaid portion of the first conduit arrangement, such heat collecting unit preferably being a solar collector panel. Fins are provided which extend outwardly from the adjacent parallel portions of both the first and second conduit means and into the phase change material to transfer heat between such conduit portions and the phase change material, and a connecting member formed of a high heat conductivity material is preferably used to join the aforesaid first and second conduit portions together and to join the fins to such conduit portions, all in a heat conducting relationship.

In the preferred embodiment of the present invention, this connecting member is formed of a length of extruded aluminum having opposed curved recepticle portions for receiving the two conduit portions, and a thin metal fin is interposed between one of the conduit portions and the connecting member when the conduit portion is pressed into the receptacle portion of the connecting member. The fins having a lengthwise extent corresponding to the connected length of the conduit portions, and the fins extend outwardly from the conduit portions in a plane extending parallel to the axes of the conduit portions.

In another embodiment, the conduit portions are arranged in a vertically stacked relationship with compression members disposed at the upper and lower ends of the stack, and rods are used to extend between the compression members to hold the conduit portions in place.

The system of the present invention also includes a unique control means that includes a first pump for pumping the potable water through the first conduit, and a first control for disenabling the first pump when the temperature of the potable water reaches a predetermined maximum temperature. Also, a second pump is provided for pumping the heat transfer liquid through the collector conduit, and a second control is provided which operates independently of the first control to disenable the second pump when the temperature of the heat transfer liquid from the collector is equal to or less than the temperature of the phase change material, or when the temperature of the phase change material reaches a predetermined maximum temperature.

In accordance with another feature of the present invention, the conduit arrangement for the solar collector, which contains the heat transfer fluid, includes a small segment in which a wall portion thereof has a predetermined reduced thickness and is formed of a material, preferably copper, that is soluble in acid. A container filled with an alkaline material is disposed at the conduit segment immediately adjacent the reduced thickness wall portion so that when the heat transfer liquid, which is preferably propyl glycol, becomes acidic, the reduced thickness wall portion will be dissolved thereby and introduce the alkaline material into the flow of the heat transfer liquid in the second conduit to neutralize the acid therein.

Finally, the heat storage chamber in the system of the present invention includes means for sealing the phase change material against exposure to ambient air, while still accommodating the expansion and contraction of the phase change material within the chamber. The chamber is partially filled with the phase change material and the remaining portion of the chamber is filled with a gaseous medium. The chamber includes a vent opening adjacent the area filled with the gaseous medium, and a sealed expandable means, such as an ullage bag, is fitted at the vent in sealed relation to the chamber to permit the gaseous medium to flow between the chamber and the sealed expandable means during expansion and contraction of the phase change material without exposing such material to ambient air.

DESCRIPTION OF THE PREFERRED EMBODIMENT

Figure 1:
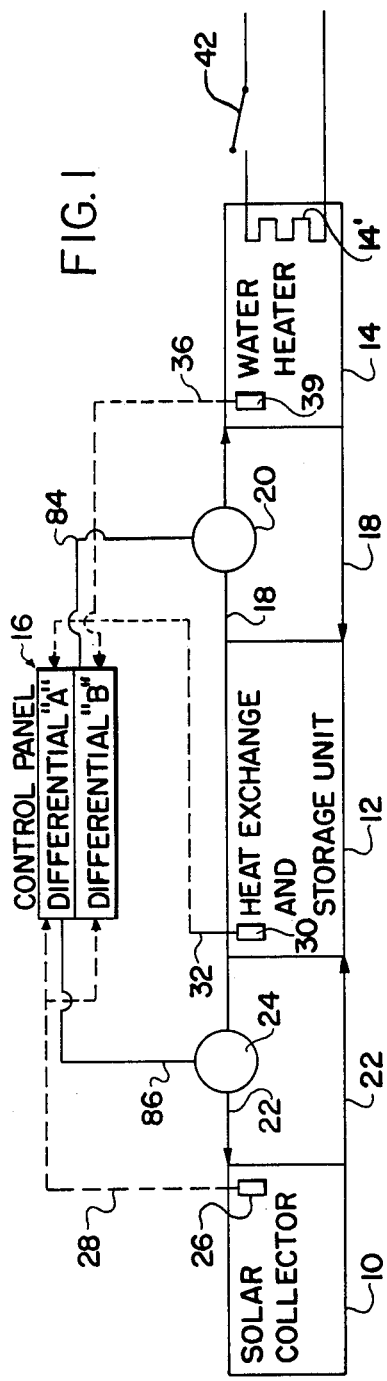
FIG. 1 is a diagrammatic view of the heat transfer and storage system of the present invention.

The heat transfer and storage system of the present invention is diagrammatically illustrated in FIG. 1, and includes a solar collector unit 10, a heat exchange and heat storage unit 12, a water heater 14, which may be, for example, a conventional residential water heater having its own heat source such as an electrical heating element 14', and an electrical control panel 16. A first conduit arrangement 18 delivers potable water in the water heater 14 to and from the heat exchange and storage unit 12, and a pump 20 is arranged to generate the flow of potable water. A second conduit arrangement 22 extends between the collector 10 and the heat exchange and storage unit 12, and a second pump 24 is disposed to cause a flow of heat transfer liquid in the second conduit 22 to and from the heat exchange and storage unit 12 and the collector 10. A conventional temperature sensing probe 26 is disposed in the collector 10 to sense the temperature of the heat transfer liquid flowing therethrough, and this probe 26 is connected by electrical line 28 to the two differential temperature control portions of the control panel 16, designated as "Differential A" and "Differential B" in FIG. 1. A similar probe 30 is located in the heat exchange and storage unit 12 to sense the temperature of the phase change material therein, and an electrical line 32 connects the probe 30 with "Differential A," and a third probe 39 senses the temperature of the potable water in water heater 14 and is connected to "Differential B" by electrical line 36. The details of the operation of this control panel 16 will be described in greater detail below.

Figure 2:
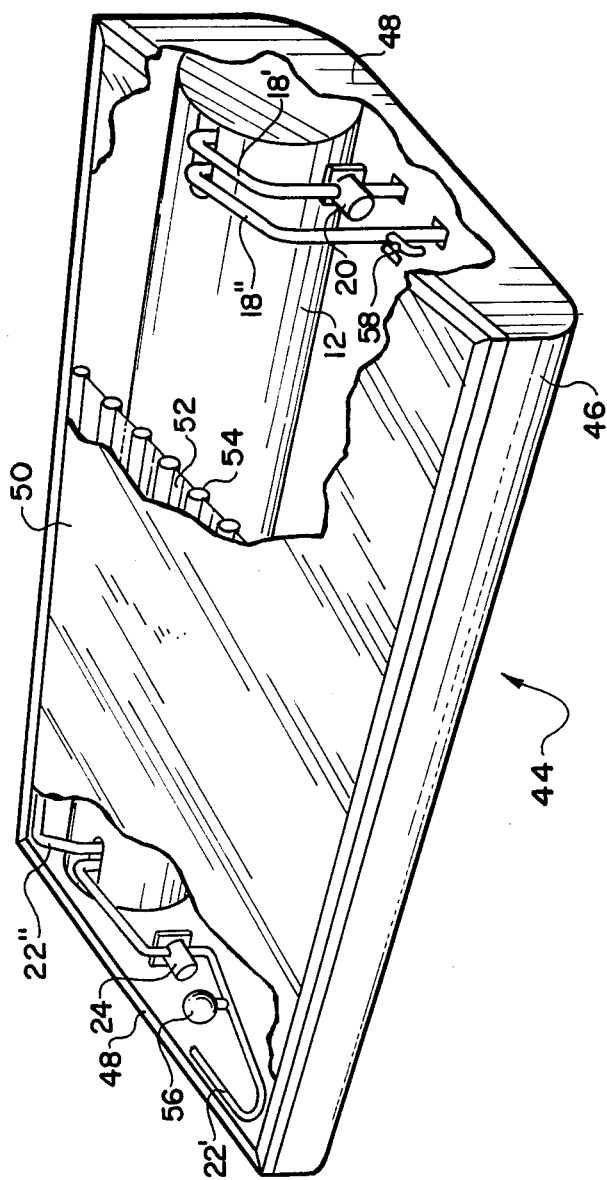
FIG. 2 is a diagrammatic view of the solar panel incorporating therein various components of the system of the present invention.

As illustrated diagrammatically in FIG. 2, all of the above-described components, except the control panel 16 and water heater 14, are conveniently and compacted carried within a panel unit 44 that includes a housing 46 formed with end panels 48 that support a top surface of glazing 50 and an absorber plate 52 disposed just beneath glazing 50, the absorber plate 52 including a plurality of pipes 54 extending along the length of the panel unit 44. The heat transfer liquid is carried in the pipes 54, alternate ones of which are connected at the lengthwise ends thereof to inlet and outlet headers (not shown), respectively, in a conventional manner well known in the art. The above-mentioned heat exchange and storage unit 12 is mounted in the housing 46, and is preferably in the form of a cylinder disposed beneath the absorber plate 52 as illustrated in FIG. 2. The flow of heat transfer liquid from the absorber plate pies 54 is carried in conduit leg 22' to the heat exchange and storage unit 12, and the flow of such liquid from the head exchange and storage unit 12 to the absorber plate pipes 54 is carried in conduit leg 22", which also includes the above-described heat transfer liquid pump 24 and an expansion tank 56. The flow of potable water from the water heater 14 (see FIG. 1) to the heat exchange and storage unit 12 is carried through conduit leg 18', which includes the above-described potable water pump 20 therein, and the flow of potable water to the water heater 14 from the heat exchange and storage unit 12 is carried in conduit leg 18", in which a relief valve 58 may be located.

Figure 3:
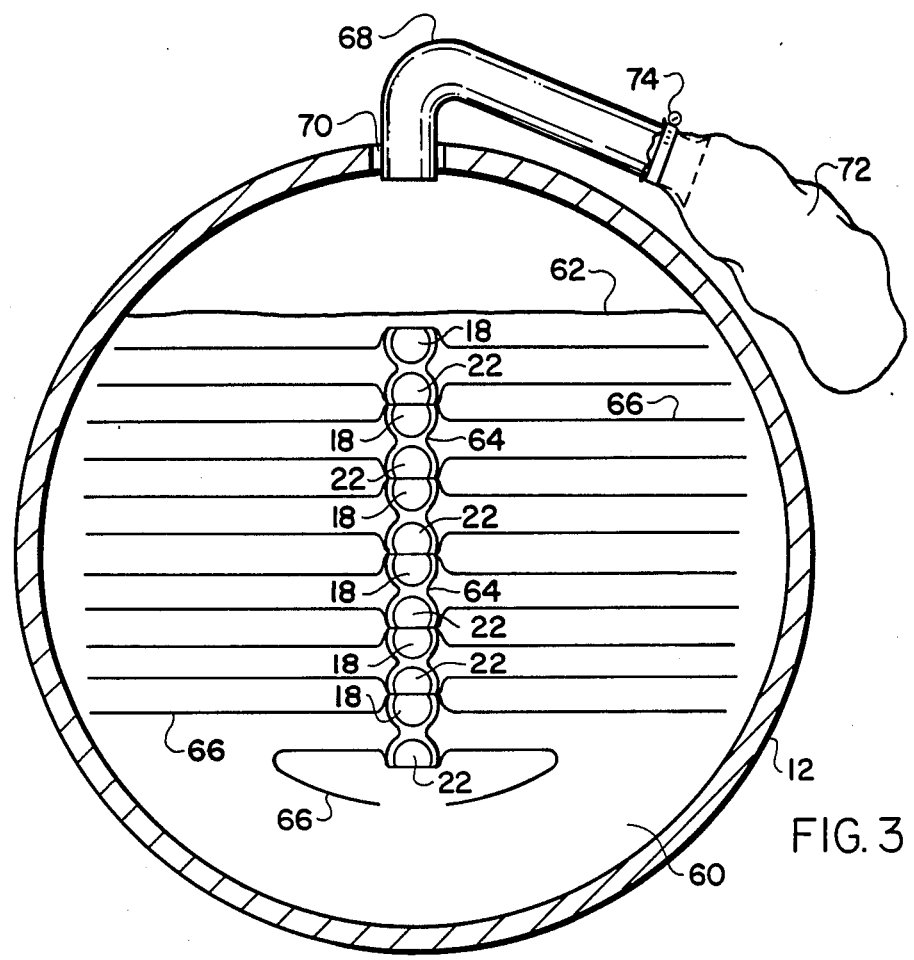
FIG. 3 is a vertical sectional view taken through the center of the heat exchange and storage unit of the present invention.

As best illustrated in the vertical sectional view of FIG. 3, the heat exchange and storage unit 12 is partially filled with a phase change material 60, preferably paraffin, up to a level indicated at 62 in its solid state, and portions of the two above-described conduit arrangements 18 and 22 are completely immersed in the paraffin 60, and arranged in a vertically stacked disposition, with the portions of conduit 18 being connected at their respective lengthwise ends to conventional inlet and outlet headers (not shown) through which potable water is conducted to and from the water heater 14 through conduit legs 18' and 18" described above, and with the portions of conduit 20 being similarly connected to inlet and outlet headers (not shown) through which the heat transfer liquid is conducted to and from the absorber plate 52 through conduit legs 22' and 22" described above. As will be described in greater detail below, the alternating portions of conduits 18 and 20 are joined together by connecting members 64, and a plurality of fins 66 extend outwardly therefrom and into the surrounding paraffin 60. An opening is formed at the top of the heat exchange and storage unit 12, and a conduit 68 extends therethrough with a grommet 70 being disposed about the conduit 68 to seal the opening through which it extends so that ambient air will not pass into the interior of the heat exchange and storage unit 12. One end of the conduit 68 terminates just below the grommet 70, and the other end thereof is connected to a flexible bag 72, preferably formed of polyurethane, a clamp 74 being provided to form an air-tight seal between the bag 72 and the conduit 68. It is well-known that many phase change materials undergo a substantial volumetric increase when they change from their solid state to a liquid state, and a corresponding substantial volumetric decrease when changing from liquid to sold. For example, paraffin will experience a thirty-five percent increase in volume in going from −40 degrees F. to +250 degrees F. The above-described construction of the heat exchange and storage unit 12 provides a simple and unique arrangement for dealing effectively and conveniently with this volumetric change of the phase change material. As shown in FIG. 3, the paraffin 60 occupies a major portion of the volume of the unit 12, and a gaseous medium is contained in the remaining area of the unit 12 above the level 62 of the paraffin 60. When the paraffin 60 expands upon sensible heat being absorbed thereby, or upon a phase change from solid to liquid, this expansion will simply cause the gaseous medium above the paraffin 60 to be passed through the conduit 68 and into the bag 72 where it is retained at virtually atmospheric pressure so as not to impede the further flow of the gaseous medium into the bag 72 during further expansion of the paraffin 60. Likewise, volumetric contraction of the paraffin 60 is accommodated in that the gaseous medium in the bag 72 can readily flow back into the unit 12 through conduit 68. Since the unit 12 is sealed by grommet 70 and the bag 72 is sealed to conduit 68 by clamp 74 no ambient air, which can cause undesirable deterioration of the paraffin 60, is admitted to the unit 12 during expansion and contraction thereof.

Figure 5:
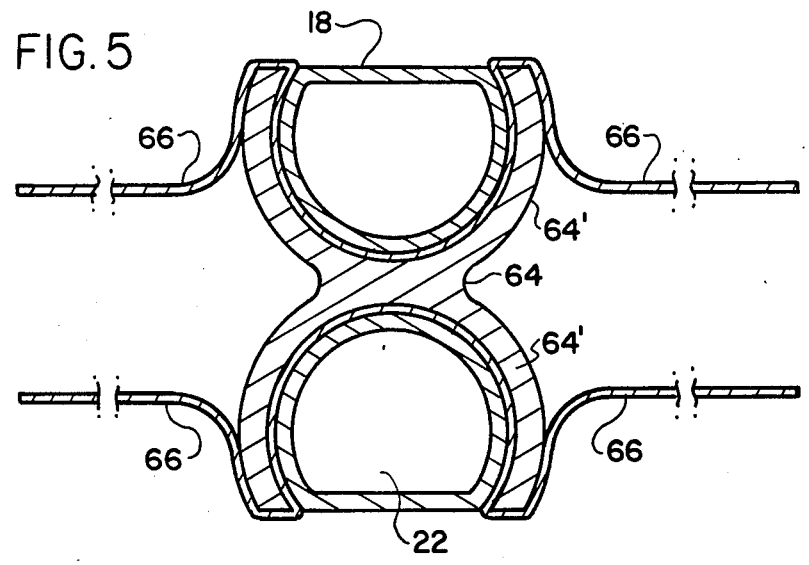
FIG. 5 is a view similar to FIG. 4 and showing the components thereof in their assembled portion.
Figure 4:
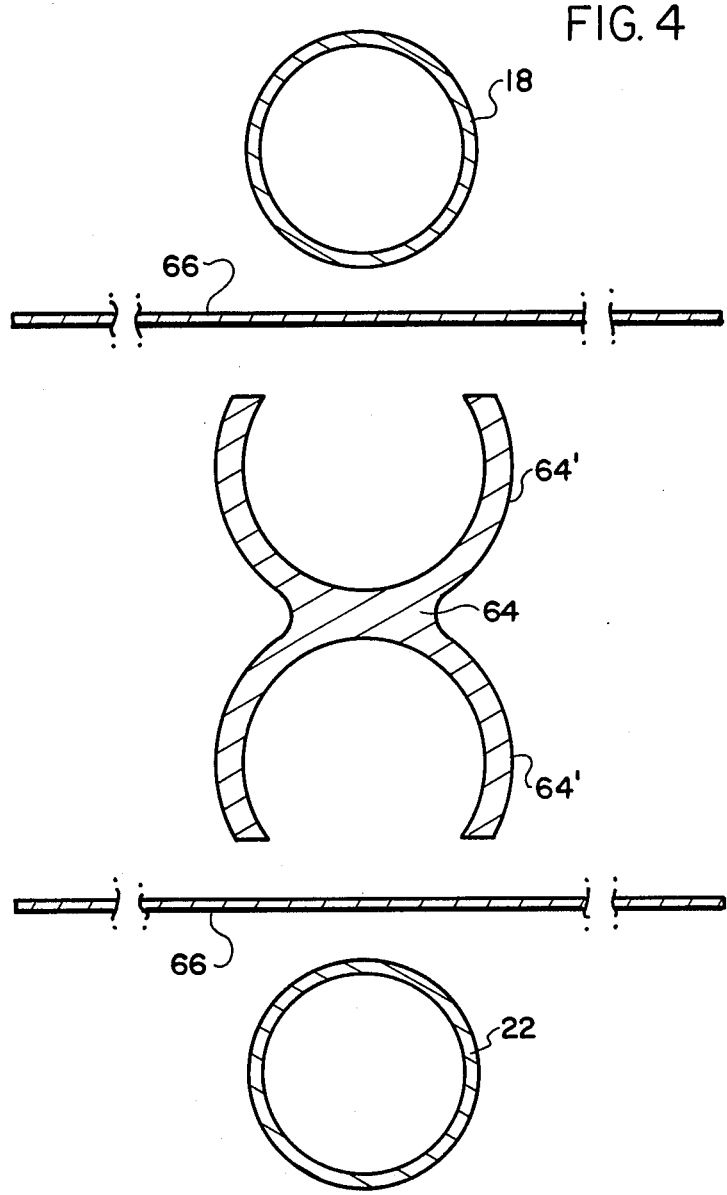
FIG. 4 is an exploded diagrammatic view of the conduit portions, fins and connector member therefor.

The formation of the portions of conduits 18,22, the connecting member 64, and the fins 66 is best illustrated in FIGS. 4 and 5. The connecting member 64 can be extruded aluminum, which makes them relatively inexpensive to produce while also providing a connecting unit that has high heat conductivity, and it will be noted that each connecting member 64 consists of two opposed pipe receiving portions 64', each formed on a radius and extending slightly beyond a half-circle. The fins 66 are extremely thin sheets of aluminum, preferably having a thickness of about 0.015 inch which is shown somewhat exaggerated in FIGS. 4 and 5 for clarity of illustration, and they have an extending length corresponding generally to the length of the cylindrical housing of the heat transfer and storage unit 12 and a varying width, as shown in FIG. 3, so that they will extend outwardly from the portions of conduits 18,22 to a point slightly spaced from interior surface of such housing. To join the aforesaid elements together, they are initially held in place in the general disposition shown in FIG. 4 by a jig or other suitable means, with the portions of conduits 18 and 22 disposed in spaced relation to the two receiving portions 64' and with a fin 66 disposed between each conduit portion and the receiving portions 64''. A press is then utilized to force the portions of conduits 18 and 22 into the opposed receiving portions 64' so that they are held in place thereby, with the thin fins 66 being bent to conform to the curvatures of the conduits and the receiving portions 64' so that they are interposed therebetween and held in place thereby. As part of this pressing operation, the portions of the conduits 18 and 22 extending beyond the opposed receiving portions 64' may be flattened as shown in FIG. 5, which provides two advantages. First, these flat surfaces permit the individual two-pipe conduit units to be stacked atop one another in a vertical disposition as shown in FIG. 3 with the adjacent flat surface offering a sufficient support so that all of the portions of the conduits 18 and 22 can be held in place within the unit 12 by their connection to the aforesaid inlet and outlet headers within the unit, and without requiring any expensive welding or other joining of the composite units that would be inherently difficult. Additionally, in their stacked disposition as shown in FIG. 3, it will be observed that the flat portions of conduit 18 are disposed immediately adjacent the corresponding flat portions of conduit 22 so that there is a significantly increased area of mutual contact between the two conduits as compared with the tangential contact of adjacent cylindrical conduits, and there is a resulting significant increase in the heat exchange that will occur between the heat transfer liquid conveyed in conduit 22 and the potable water conveyed in conduit 18. Apart from these advantages, it will also be appreciated that simple and relatively inexpensive assembly of the conduits 18,22 and the fins 66 offer a substantial improvement over the conventional method of attaching fins to conduits by individually welding the fins to the conduits in spaced relation along the length of the conduits and with the fins extending outwardly from the conduits in radial planes, all of which involved a time-consuming and expensive assembly procedure. Moreover, in the arrangement of the present invention, it will be noted that two fins 66 extend outwardly from each pair of joined conduits 18,22 in planes extending parallel to the axes thereof, and that there is a substantial area of conduit between the fins 66, the conduits 18,22 and the heat-conducting connecting members 64 along the entire extending lengths thereof which significantly increases the capacity of the fins 66 in carrying out their intended function, namely to quickly conduct heat from the conduit 22 to the paraffin 60 for storage when the temperature of the heat transfer liquid is greater than that of the paraffin 60, and to quickly conduct the stored heat in the paraffin 60 to the potable water in conduit 18 when the temperature of such water is less than the temperature of the paraffin.

Figure 7:
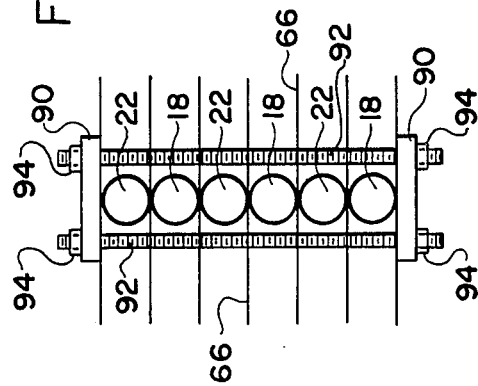
FIG. 7 is a diagrammatic view of an alternate embodiment of the conduit portions, fins and connector arrangement therefor.

An alternate embodiment of the mounting arrangement for the portions of the conduits 18,22 within the heat transfer and storage unit 12, and the fins 66 is illustrated in FIG. 7. In this embodiment, the conduits 18,22 are stacked alternatively as a vertical bank, and one of the fins 66 is interposed between each two adjacent conduit portions and at the two end conduit portions in direct, heat conducting contact therewith. To hold the conduit portions 18,22 and fins 66 in place, a connecting system is provided which includes a pair of compression blocks 90 located adjacent the uppermost and lowermost fins 66, and a pair of connecting rods 92 being threaded to receive nuts 94 thereon. It is to be appreciated that the tightening of the nuts 94 will compress the entire arrangement of the portions of conduits 18,22 and the fins 66 to hold them in place as illustrated in FIG. 7, and the compression force generated by the rods 92 and nuts 94 will insure that these elements are maintained in a heat conducting relationship. Again, this alternate embodiment offers an inexpensive and effective mounting arrangement for the portions of the conduits 18,22 and the fins 66 which can be easily mounted within the heat transfer and storage unit 12 to provide a rapid and effective transfer of heat between the paraffin 60 and the conduits 18 and 22.

Figure 6:
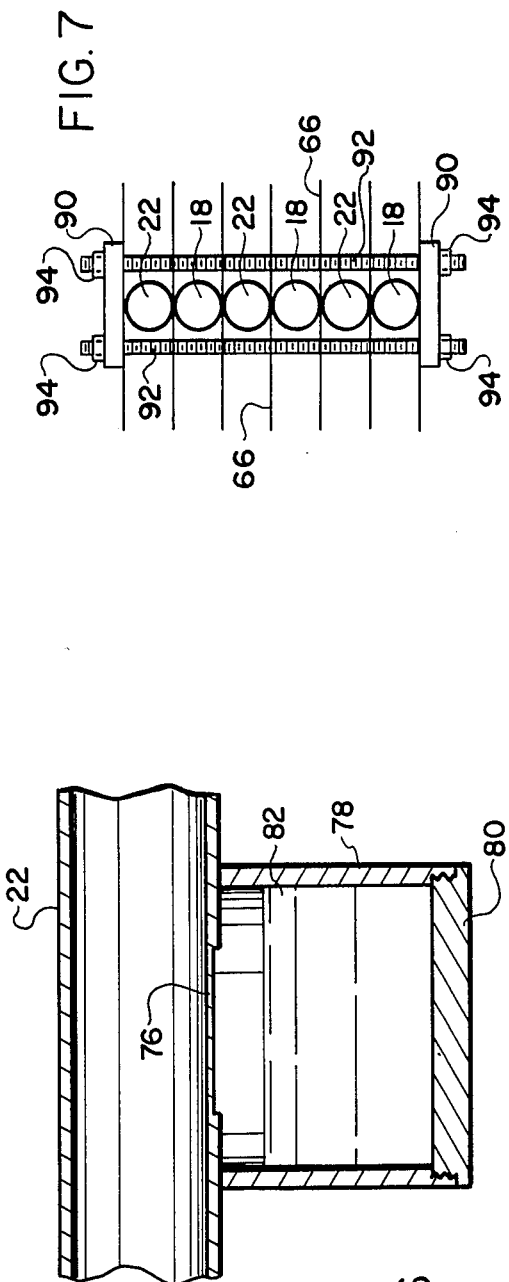
FIG. 6 is a detail view, in section, showing the segment of the collector conduit portion at which the alkaline receptacle is disposed.

In accordance with another feature of the present invention, the heat transfer liquid conduit 22 is formed with a specially formed segment that can be used with heat transfer liquids, such as propyl glycol, that may become acidic over time and cause damage to the system as discussed above. FIG. 6 illustrates a segment of conduit 22 which may be located at any exposed portion thereof, and which includes a wall portion 76 that has a predetermined reduced thickness as compared with the normal thickness of the conduit 22, and which is formed of a material that is readily soluble in acid, such as copper. A receptacle 78 is fitted on the conduit 22 and disposed immediately adjacent the wall portion 76, and a threaded cap 80 is provided at the extending end of the receptacle 78 which can be removed to fill or partially fill the receptacle with an alkaline material 82 and which, when closed, seals the receptacle 78. If the heat transfer liquid in conduit 22 becomes acidic, the acid will dissolve the thin wall portion 76 and the alkaline material 82 in the receptacle 78 will then be released into the flow of the heat transfer liquid in conduit 22 and neutralize the acid therein. Since the receptacle 78 is sealed, the rupture of the thin wall portion 76 will not result in any leakage of the heat transfer liquid from the conduit 22, and the disposition of the receptacle 78 about the thin wall portion 76 will provide protection therefor so that it cannot be inadvertently ruptured during handling, installation and use.

The operation of the above-described solar heat transfer and storage system is as follows. The solar panel unit 44 is placed at a convenient location (e.g. on a roof or on the ground) where it will be exposed to the sun's rays, and the solar heat will be absorbed by the absorber plate 52 to heat the heat transfer liquid in the pipes 54. The pump 24 will cause the heat transfer liquid to flow through the conduit arrangement 22 and the portions thereof immersed within the paraffin 60 in the heat transfer and storage unit 12. At the same time, the potable water in the water heater 14 is conveyed by pump 20 through the conduit arrangement 18 and the portions thereof immersed in the paraffin 60, which preferably is selected to have a melting temperature that corresponds generally to the desired high temperature for the potable water in the water heater 14 (e.g. in the range of 110°-150° F., preferably about 115° F.). Assuming that the temperature of the heat transfer liquid is greater than that of the paraffin 60 or the potable water in the water heater 14, and assuming that the temperature of the paraffin 60 is below its melt point, it will be appreciated that most of the heat in the heat transfer liquid is conducted directly and quickly to the potable water by virtue of the contracting and heat conducting disposition of the portions of conduits 18,22 as shown in FIG. 3 and described above so that the potable water in the water heater 14 is quickly elevated. Moreover, some of the heat in the heat transfer liquid is absorbed by the paraffin 60 in sensible heat fashion by virtue of the immersion of the portions of conduit 22 in the paraffin 60 and the increased conduction of such heat to the paraffin 60 through the large surface area provided by the plurality of fins 66. During this phase of the operation, the paraffin 60 is in a solid state and while it absorbs some sensible heat, it primarily acts as a heat insulator so that, as noted above, the heat in the heat transfer liquid is transmitted directly to the potable water to raise the temperature thereof at a relatively rapid rate.

When the temperature of the potable water reaches the aforesaid desired temperature (e.g. 115° F.), which corresponds generally to the melt point of paraffin 60, the additional heat conveyed to the paraffin 60 will begin its phase change from solid to liquid, and during this phase change virtually all of the heat in the heat transfer liquid is transmitted in latent heat fashion to the paraffin 60, and very little of this heat is transmitted to the potable water which has now reached its predetermined desired temperature. As the paraffin 60 begins to melt in the unit 12, the liquid portion moves around within the unit 12 and about the portion of conduit 22 to facilitate further the rapid transfer of heat to the paraffin. During this phase of the operation, most of the heat in the heat transfer liquid is conveyed to, and effectively stored in, the paraffin 60, and this continues for as long as the temperature of the heat transfer liquid is greater than that of the paraffin, or until the pump 24 is disenabled by the control panel 16 if a predetermined maximum temperature is reached as described below.

When the temperature of the heat transfer liquid drops below that of the paraffin 60, or that of the potable water, such as at night when no solar heat is being absorbed by the absorber plate 52, the pump 24 is disenabled and there is no further flow of the heat transfer liquid through the conduit 22. Because, however, of the large amount of heat stored in the paraffin 60, if the temperature of the potable water drops below its desired level, the pump 20 will cause a flow of the potable water through the heat transfer and storage unit 12 so that it will absorb the stored heat in the paraffin 60 which is conducted to the potable water through the fins 66 and the portion of the conduit 18 immersed in the paraffin. During this phase, the paraffin 60 may be in a liquid state so that the conduction of heat to the potable water is rapid.

The control of the flow of the heat transfer liquid and the potable water by the pumps 24 and 20, respectively, is carried out by the control panel 16. "Differential A", which is a convention temperature differential sensing and control component, receives the sensed temperature of the paraffin 60 through probe 30 and electrical line 32, and receives the sensed temperature of the heat transfer liquid through probe 26 and electrical line 28. The pump 24 is normally operating to cause flow of the heat transfer liquid through the conduit 22 as described above, but when "Differential A" determines that the temperature of the heat transfer liquid is equal to or less than that of the paraffin 60, it will generate a control signal through electrical line 86 to disenable or shut down pump 24 so that the flow of the heat transfer liquid through the system is discontinued. Also, the "Differential A" control may be programmed to disenable pump 24 at any time the temperature of the paraffin 60 reaches a predetermined maximum temperature (e.g. 150° F.) This cutoff of the pump 24 is provided because of the temperature if the temperature of the paraffin exceeds the predetermined maximum level, it will cause excessive expansion of the paraffin, and will cause large heat loss to the ambient air which results in less efficient heat storage.

The "Differential B," which operates independently of "Differential A", receives the sensed temperature of the heat transfer liquid from probe 26 and the sensed temperature of the potable water in the water heater 14 through probe 34. The pump 20 is normally operable to cause flow of the potable water through conduit 18, but when "Differential B" determines that the temperature of the potable water is greater than the temperature of the paraffin 60, the pump 20 is disenabled by a control signal transmitted through electrical line 84. Also, "Differential B" is set to disenable the pump 20 at any time the potable water in the water heater 14 reaches a predetermined maximum temperature (e.g. 170° F.).

Since the conduit arrangement 18 for the potable water is independent of the conduit arrangement 22 for the heat transfer liquid, and since the respective pumps 20 and 24 are also independently controlled by "Differential A" and "Differential B", the system of the present invention can be operated with unusually high efficiency and with great flexibility of use. For example, when absorber plate 52 is collecting large amounts of solar energy during bright sunshine, this heat will be conducted primarily to the potable water if the temperature thereof is below its desired temperature, or will be conducted primarily to the paraffin 60 for storage if heating of the potable water is not required. Thus, in a typical application of the system to heat the water in a residential water heater, such water is normally not used during the middle of the day and the pump 20 will normally be disenabled during such times because the potable water has reached its predetermined desired temperature. Since the pump 20 is disenabled, there will be no flow of the potable water through the poriton of conduit 18 within the heat transfer and storage unit 12, and, therefore, there will be little heat exchange within such unit 12 even through the portion of the conduits 18 and 22 in a heat conducting relationship within the unit 12, and virtually all of the heat absorbed by the absorber plate 52 will be stored in the paraffin for subsequent use. If, however, the hot water in the water heater 14 should be used during the daytime period, the temperature of the potable water will normally drop to a point at which pump 20 is cut on, and the potable water will then flow through the portion of conduit 18 disposed in heat conducting relationship to the portions of conduit 22 so that available heat in the heat transfer liquid will be conducted primarily to the potable water to quickly raise the temperature thereof rather than primarily storing the available heat in the paraffin 60. Moreover, during times when little or no solar heat is available, such as during the night or during cloudy portions of the day, the pump 24 will normally be disenabled, but if heat is needed to raise the temperature of the potable water, pump 20 will be operating to cause flow of the potable water through the paraffin 60 whereby available stored heat therein is utilized to heat the potable water, and there is little or no heat loss to the heat transfer liquid in conduit 22 because it is not flowing.

To summarize the above, it will be observed that the control system operates as follows:

(a) When solar energy is available and heat is needed to raise the temperature of the potable water, both pumps 20 and 24 are operable to obtain maximum direct heat exchange from the heat transfer liquid to the potable water, with only a small amount of such available heat being stored in the paraffin.

(b) When solar energy is available and heat is not needed for the potable water, pump 20 is disenabled and pump 24 is operated to cause maximum storage of the available heat in the paraffin, with little or no transfer of heat to the dormant potable water circuit.

(c) When solar energy is not available and heat is needed to raise the temperature of the potable water, pump 24 is disenabled and pump 20 will be operated any time stored heat is available from the paraffin, with little or no heat loss to the dormant heat transfer liquid.

(d) When solar energy is not available and when there is no available stored heat in the paraffin, both pumps 20 and 24 are disenabled and heat can be obtained from the heating element 14' of the water heater to essentially the same extent as would be possible if the auxiliary solar system of the present invention were not being used.

Thus, the independent conduit arrangement for the potable water and the heat transfer liquid, and the independent control for each of these circuits, when combined with heat exchange relationship of the portion of conduits 18 and 22 immersed in the paraffin, provides a system which is highly efficient and which responds quickly to the varying requirements of the user and the varying conditions of the system itself.

As indicated above, the preferred embodiment of the present invention utilizes a solar collector panel for collecting solar energy which is then stored, but it will be appreciated that the system of the present invention could also use other sources for collecting heat energy in lieu of the solar panel, such as conventional electrical energy obtained during off-peak demand time periods or waste industrial heat, and many of the advantages of the present invention would still be realized.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any other embodiment, adaptations, variations, modifications and equivalent arrangements, the present invention being limited only by the claims appended hereto and the equivalents thereof.

I claim:

1. A heat transfer and storage system comprising:
   (a) a heat storage chamber having a phase change material contained therein;
   (b) water heater means for containing potable water, and including first conduit means through which said water flows, said first conduit means having a portion thereof extending through said phase change material in said chamber;
   (c) means for collecting heat energy, and including second conduit means through which a heat transfer liquid flows, said second conduit having a portion thereof extending through said phase change material in said chamber in adjacent parallel relation to said portion of said first conduit means;
   (d) fin means extending outwardly from said portions of said first and second conduit means to transfer heat between said conduit portions and said phase change material; and
   (e) connecting means simultaneously holding said portions of said first and second conduit means in adjacent heat conducting relationship to one another and holding said fin means interposed between said portions of said first and second conduit means in a heat conducting relationship therewith.

2. A heat transfer and storage system as defined in claim 1 and further characterized in that said means for collecting heat energy comprises solar collector means for collecting solar heat energy.

3. A heat transfer and storage system as defined in claim 2 and further characterized in that said fin means extend outwardly from said portions of said conduits in a plane extending parallel to the axes of said conduit portions.

4. A heat transfer and storage system as defined in claim 2 and further characterized in that said connecting means is formed of a material having high heat conductivity, and in that said connecting means extends along the length of said conduit.

5. A solar heat transfer and storage system as defined in claim 2 and further characterized in that said fin means constitutes thin metal sheets interposed between said portions of said conduit means and connecting means, and held in place thereat by said portions of said conduit means being pressed into said connecting means for retention thereby.

6. A heat transfer and storage system as defined in claim 5 and further characterized in that said connecting means is a length of metal formed with opposed curved receptacle portions extending lengthwise thereof for receiving said first and second conduit portions, respectively, with said fin means being interposed between said connecting member and at least one of said conduit portions along the lengthwise extent thereof.

7. A heat transfer and storage system as defined in claim 2 and further characterized in that said first and second conduit means are arranged serially with their axes disposed in a common plane and with said fin means interposed therebetween, and in that said connecting means includes holding elements disposed at the respective ends of said serially arranged conduit means and compression means for urging said holding elements toward one another to hold said conduit means and said fin means in place therebetween.

8. A heat transfer and storage system as defined in claim 2 and further characterized in that first and second pump means are provided for causing fluid flow through said first and second conduit means, respectively; in that a first control means is provided for disenabling said first pump means when the temperature of said potable water reaches a predetermined maximum temperature; and in that second control means is provided for disenabling said second pump means when the temperature of said fluid in said second conduit means is equal to or less than the temperature of said phase change material.

9. A heat transfer and storage system as defined in claim 8 and further characterized in that said second control means disenables said second pump means when the temperature of said phase change material reaches a predetermined maximum temperature.

10. A heat transfer and storage system as defined in claim 8 and further characterized in that said first control means disenables said first pump when the temperature of said potable water is equal to or greater than the temperature of said phase change material.

11. A heat transfer and storage system as defined in claim 2 and further characterized in that said second conduit means includes a segment in which a wall portion thereof has a predetermined reduced thickness and is formed of a material that is soluble in acid; in that the heat transfer liquid in said second conduit means is a liquid which tends to become acidic with the passage of time; and in that a sealed receptacle containing an alkaline material is disposed at said conduit segment immediately adjacent said reduced thickness wall portion, whereby when said heat transfer liquid becomes acidic said wall portion will be dissolved thereby and introduce said alkaline material into the flow of said heat transfer liquid in said second conduit means.

12. A heat transfer and storage system as defined in claim 11 and further characterized in that said wall portion is formed of copper, and in that said heat transfer liquid is propyl glycol.

13. A heat transfer and storage system as defined in claim 2 and further characterized in that said heat storage chamber is a rigid container partially filled with a phase change material that expands when heated, with the remaining portion of said heat storage chamber being filled with a gaseous medium; in that said heat storage chamber includes a vent opening adjacent the area containing said gaseous medium; and in that a sealed expandable means is fitted at said vent to permit said gaseous medium to flow between said heat storage chamber and said sealed expandable means during expansion and retraction of said phase change material without exposing said phase change material to ambient air.

14. A heat transfer and collection system, comprising:
(a) a heat storage chamber having a phase change material contained therein;
(b) water heater means for containing potable water, and including first conduit means extending through said phase change material in said heat storage chamber and first pump means for moving said potable water through said first conduit means;
(c) means for collecting heat energy, and including second conduit means extending through said phase change material in said heat storage chamber, and second pump means for pumping a fluid through said second conduit means, whereby said collected energy in said second conduit means is transfered to said phase change material;
(d) first control means for disenabling said first pump means when the temperature of said potable water reaches a predetermined maximum temperature;
(e) second control means for disenabling said second pump means when the temperature of said fluid in said second conduit means is equal to or less than the temperature of said phase change material; and
(f) third control means for disenabing said first pump means when the temperature of said potable water is greater than the temperature of said phase change material.

15. A heat transfer and storage system as defined in claim 14 and further characterized in that said means for collecting heat energy comprises solar collector means for collecting solar heat energy.

16. A heat transfer and collection system as defined in claim 15 and further characterized in that said first and second conduit means extend through said phase change material in contacting relationship to one another, and in that a plurality of heat conducting fin means are arranged in heat conducting contact with said first and second conduit means and extend outwardly therefrom and into said phase change material to conduit heat between said first and second conduit means and said phase change material.

17. A heat transfer and collection system as defined in claim 16 and further characterized in that said first and second conduit means include portions thereof that are arranged in parallel contacting relationship.

18. A heat transfer and collection system as defined in claim 15 and further characterized in that said second control means disenables said pump means when the temperature of said fluid pumped in second conduit means reaches a predetermined maximum temperature.

19. A heat transfer and collection system as defined in claim 15 and further characterized in that said phase change material has a predetermined melting temperature within the range of 110-150 degrees F.

20. A heat transfer and storage system comprising:
(a) a heat storage chamber having a heat transfer material contained therein;
(b) water heater means for containing potable water, and including first conduit means through which said water flows, said first conduit means having a portion thereof extending through said heat transfer material in said chamber;
(c) means for collecting heat energy, and including second conduit means through which a heat transfer liquid flows, said second conduit having a portion thereof extending through said heat transfer material in said chamber in adjacent parallel relation to said portion of said first conduit means;
(d) fin means extending outwardly from said portions of said first and second conduit means to transfer heat between said conduit portions and said heat transfer material; and
(e) connecting means simultaneously holding said portions of said first and second conduit means in adjacent heat conducting relationship to one another and holding said fin means interposed between said portions of said first and second conduit means in a heat conducting relationship therewith.

21. A heat transfer and storage system as defined in claim 20 and further characterized in that said means for collecting heat energy comprises solar collector means for collecting solar heat energy.

* * * * *